US005576919A

United States Patent [19]

Wilkens

[11] Patent Number: 5,576,919

[45] Date of Patent: Nov. 19, 1996

[54] SPARK SUPPRESSOR CIRCUIT FOR PROTECTION OF AN ELECTRICAL SWITCH, AND ELECTRICAL THERMAL APPLIANCE COMPRISING SUCH A CIRCUIT

[75] Inventor: Bernardus F. R. I. Wilkens, Singapore, Singapore

[73] Assignee: U.S. Philips Corporation, New York, N.Y.

[21] Appl. No.: 243,895

[22] Filed: May 17, 1994

[30] Foreign Application Priority Data

Jun. 1, 1993 [EP] European Pat. Off. .............. 93201553

[51] Int. Cl.[6] ........................ H01G 2/12

[52] U.S. Cl. ........................ 61/13; 361/56

[58] Field of Search ........................ 307/136; 361/13, 361/2, 56

[56] References Cited

U.S. PATENT DOCUMENTS

| | | | |
|---|---|---|---|
| 3,555,353 | 1/1971 | Casson | 307/136 |
| 3,783,305 | 1/1974 | Lefferts | 307/136 |
| 4,585,926 | 4/1986 | Easthill | 219/506 |

FOREIGN PATENT DOCUMENTS

| | | |
|---|---|---|
| 2430679 | 2/1980 | France . |
| 2626115 | 7/1989 | France . |
| 3543804 | 6/1986 | Germany . |
| 60-11912 | 11/1985 | Japan . |

*Primary Examiner*—Jeffrey A. Gaffin
*Assistant Examiner*—Sally C. Medley
*Attorney, Agent, or Firm*—Ernestine C. Bartlett

[57] ABSTRACT

A spark suppressor circuit (1) is provided for protection of an electrical switch (4) which in series with a load (2) is connected between a first supply voltage terminal (8) and a second supply voltage terminal (10), the load (2) and the electrical switch (4) being interconnected at a switch terminal (6). The spark suppressor circuit (1) comprises: a first (12), a second (14) and a third (16) connection terminal connectable to the first supply voltage terminal (8), the second supply voltage terminal (10) and the switch terminal (6), respectively, a triac (18) having a first main electrode (20) connected to the third connection terminal (16), having a second main electrode (22) connected to the second connection terminal (14), having a gate electrode (24) connected to the first connection terminal (12) via a resistor (32), a diac (26) connected between the gate electrode (24) and a node (28), and a capacitor (30) connected between the node (28) and the third connection terminal (16), the resistor (32) being coupled between the first connection terminal (12) and the node (28) to supply a current in response to a voltage difference between the first connection terminal (12) and the third connection terminal (16).

18 Claims, 2 Drawing Sheets

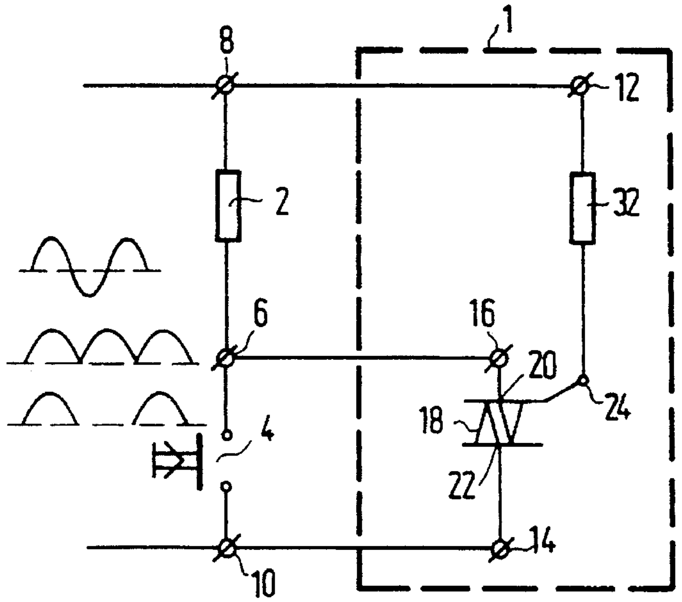
FIG. 1
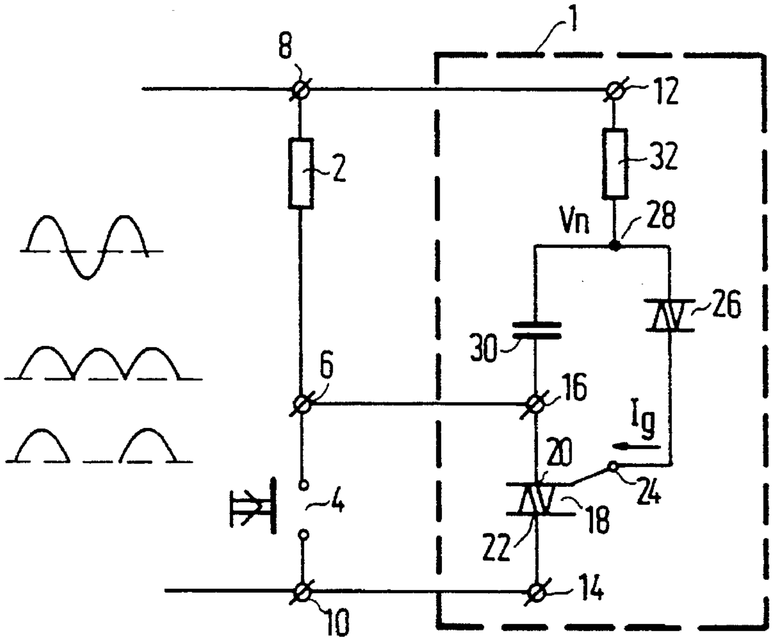
FIG. 2
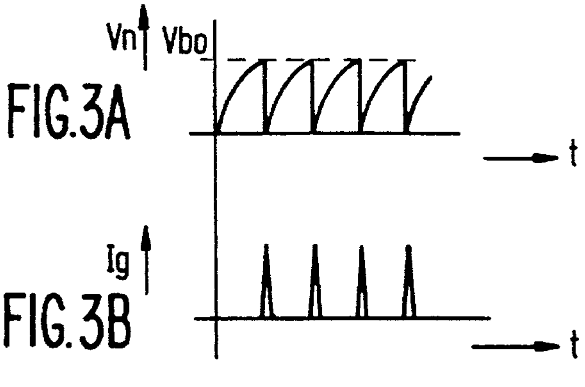
FIG. 3A
FIG. 3B

SPARK SUPPRESSOR CIRCUIT FOR PROTECTION OF AN ELECTRICAL SWITCH, AND ELECTRICAL THERMAL APPLIANCE COMPRISING SUCH A CIRCUIT

FIELD OF THE INVENTION

The invention relates to a spark suppressor circuit for protection of an electrical switch which in series with a load is connected between a first supply voltage terminal and a second supply voltage terminal, the load and the electrical switch being interconnected at a switch terminal, the spark suppressor circuit comprising:

a first, a second and a third connection terminal connectable to the first supply voltage terminal, the second supply voltage terminal and the switch terminal, respectively, a triggerable electronic switch having a first main electrode connected to the third connection terminal, having a second main electrode connected to the second connection terminal, and having a gate electrode, and trigger means for triggering the triggerable electronic switch.

The invention further relates to an electrical thermal appliance comprising such a spark suppressor circuit.

BACKGROUND OF THE INVENTION

A spark suppressor circuit of this type is known from French Patent Application 2,626,115. Electrical thermal appliances, such as irons, coffee-makers and cookers, use thermostats to control the temperature. In these thermostats a bimetal operates an electrical switch to interrupt the current to the heating element. In thermal appliances the trend is towards higher power heating elements. The higher power results in a larger current, causing increased wear of the contacts of the electrical switch. The increased wear reduces the lifetime of the thermostat, which may even become less than the life expectancy of the thermal appliance. The wear is caused by sparking between the contacts of the electrical switch at the instants of opening, closing and bouncing of the electrical switch. A spark suppression circuit may be employed to prevent sparking and to increase the lifetime of the electrical switch.

In the known spark suppression circuit the electrical switch is connected in series with an inductive load at the switch terminal. The series connection of the switch and the load is arranged between the first and the second supply voltage terminal, which terminals are connected to an a.c. mains voltage. The first main electrode of the triggerable electronic switch is connected to the switch terminal via a resistor. The trigger gate of the triggerable electronic switch is connected to the first main electrode of the triggerable electronic switch via a threshold device. When the electrical switch opens the interruption of the current through the inductive load causes a voltage increase at the switch terminal, which triggers the triggerable electronic switch, thus temporarily short-circuiting the electrical switch until the next half-cycle of the a.c. mains voltage. A drawback of this known spark suppression circuit is that it is only suitable for use with inductive loads, such as relay coils, transformers and motors. A resistive load, such as a heating element in a thermal electrical appliance will not produce a voltage peak which is sufficiently high to trigger the triggerable electronic switch.

SUMMARY OF THE INVENTION

Therefore, it is an object of the invention to provide a spark suppression circuit which also operates with resistive loads. To achieve this, according to the invention, a spark suppression circuit as defined in the opening paragraph is characterized in that the trigger means comprises current supply means coupled between the first connection terminal and the gate electrode of the triggerable electronic switch.

The current supply means, for example a resistor or any other suitable impedance, produces a current flowing into the gate of the triggerable electronic switch. The triggerable electronic switch is not triggered as long as the electrical switch is closed. At the instant at which the electrical switch opens a sudden voltage increase appears across the main electrodes of the triggerable electronic switch. The voltage increase and the gate current cause the triggerable electronic switch to be triggered, the contacts of the electrical switch are short-circuited and any spark is suppressed. At the next zero crossing of the supply voltage the triggerable electronic switch is turned off. Since the voltage increase in the next half-cycle of the mains voltage is too slow to retrigger the triggerable electronic switch, the contacts of the electrical switch are no longer short-circuited in the next half-cycle.

The voltage increase needed to trigger the triggerable electronic switch is susceptible to tolerances and may cause uncertainty as to the effectiveness of the spark suppression effect. This problem can be solved by an embodiment of a spark suppressor circuit according to the invention which is characterized in that the trigger means further comprises:

a threshold device connected between the gate electrode of the triggerable electronic switch and a node, for passing current to the gate electrode when the voltage difference between the gate electrode and the node exceeds a predetermined value, and a capacitor connected between the node and the third connection terminal.

When the electrical switch is closed a voltage will appear across the load and the current supply means will charge the capacitor until the threshold voltage of the threshold device is reached. The accumulated charge in the capacitor is sufficient to trigger the triggerable electronic switch and the capacitor is discharged via the threshold device and the gate electrode of the triggerable electronic switch. As long as the electrical switch remains closed triggering will not cause the triggerable electronic switch to be turned on because the voltage across the main electrodes is zero. However, if the electrical switch is opened the supply voltage will appear across the main electrodes of the triggerable electronic switch and subsequent triggering will cause the triggerable electronic switch to be turned on, thereby short-circuiting the electrical switch until the next half-cycle of the supply voltage. If the electrical switch remains open for subsequent half-cycles of the supply voltage the capacitor cannot be charged by the current supply means because there is no voltage difference across the load, and the triggerable electronic switch will not be triggered. The operation of the spark suppressor circuit according to the invention is now independent of the magnitude of a voltage increase at the switch terminal.

The triggerable electronic switch is preferably a triac and the threshold device is preferably a diac, allowing both non-rectified and rectified mains supply voltages to be used. The current supply means is preferably a resistor. The spark suppressor circuit according to the invention is very advantageous in thermal electrical appliances. It enables the use of a comparatively cheap and simple thermostat without excessive wear of the electrical switch. Compared with a fully electronic temperature control the advantage of the spark suppressor circuit is its lower costprice and the low power dissipation of the triggerable electronic switch because this switch is conductive only for short periods of time.

BRIEF DESCRIPTION OF THE DRAWINGS

The invention will now be described in more detail, by way of example, with reference to the accompanying drawings, in which:

FIG. 1 shows an electrical circuit diagram of a first embodiment of a spark suppression circuit according to the invention;

FIG. 2 shows an electrical circuit diagram of a second embodiment of a spark suppression circuit according to the invention;

FIG. 3 shows waveforms of signals appearing in the circuit shown in FIG. 2;

Figure 4:
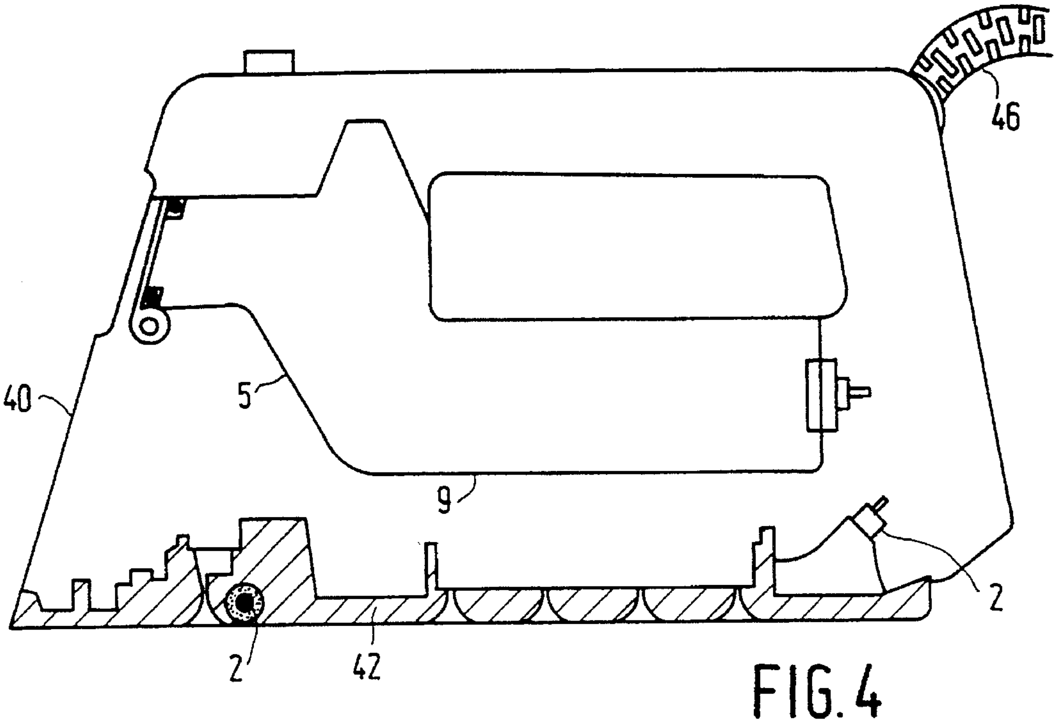
FIG. 4 diagrammatically shows an electric iron comprising a spark suppression circuit according to the invention.

In these Figures elements with like functions or meanings bear the same reference signs.

DETAILED DESCRIPTION OF THE PREFERRED EMBODIMENTS

FIG. 1 shows the circuit diagram of a first embodiment of a spark suppression circuit 1 according to the invention. A load 2 is connected in series with an electrical switch 4 at a switch terminal 6. The load 2 and the electrical switch 4 are further connected to a first supply voltage terminal 8 and a second supply voltage terminal 10, respectively. The supply voltage applied to the first and second supply voltage terminals 8 and 10 may be the a.c. mains supply voltage, the rectified a.c. mains supply voltage or any other suitable alternating voltage. The spark suppression circuit 1 has a first connection terminal 12, a second connection terminal 14 and a third connection terminal 16, which are connected to the first supply voltage terminal 8, the second supply voltage terminal 10 and the switch terminal 6, respectively. The circuit further comprises a triggerable electronic switch 18, in the present example a triac, having a first main electrode 20 connected to the third connection terminal 16, having a second main electrode 22 connected to the second connection terminal 14, and having a gate electrode 24 connected to the first connection terminal 12 via a current supply means 32. The current supply means 32, for example a resistor or any other suitable impedance, produces a current into the gate 24 of the triggerable electronic switch 18. The triggerable electronic switch 18 is not triggered as long as the electrical switch 4 is closed. At the instant at which the electrical switch 4 is opened a sudden voltage increase appears across the main electrodes 20, 22 of the triggerable electronic switch 18. The voltage increase and the gate current cause the triggerable electronic switch 18 to be triggered, the contacts of the electrical switch 4 are short-circuited and any spark is suppressed. At the next zero crossing of the supply voltage the triggerable electronic switch 18 is turned off. As the voltage increase in the next half-cycle of the mains voltage is too slow to retrigger the triggerable electronic switch 18 the contacts of the electrical switch 4 are no longer short-circuited in the next half-cycle.

If the mains voltage is rectified and not smoothed the triggerable electronic switch 18 may be a thyristor.

FIG. 2 shows a second embodiment. A threshold device 26, in the present example a diac, is added and connected between the gate electrode 24 of the triggerable electronic switch 18 and a node 28, to allow the passage of current to the gate electrode 24 when the voltage difference between the gate electrode 24 and the node 28 exceeds a predetermined value. In addition, a capacitor 30 is connected between the node 28 and the third connection terminal 16. The current supply means 32 is now coupled to the node 28 to supply a current in response to a voltage difference between the first connection terminal 12 and the third connection terminal 16. The current supply means shown in FIG. 2 is again a resistor, which is connected between the node 28 and the first connection terminal 12. However, alternatively any other suitable impedance or a transistor arranged as a current source are possible.

If the supply voltage is a non-rectified AC mains supply voltage the spark suppressor circuit 1 shown in FIG. 2 operates as follows. The electrical switch 4 is either closed or open. If the electrical switch 4 is closed the full mains supply voltage appears across the load 2. During the positive half-cycle of the mains supply voltage the first connection terminal 12 is positive with respect to the third connection terminal 16. The capacitor 30 will be charged via the resistor 32. As soon as the voltage Vn at the node 28 reaches the breakover voltage Vbo of the diac 26 the diac 26 is turned on and a gate current Ig discharges the capacitor 30 into the gate electrode 24 of the triac 18. This process is illustrated in FIG. 3. During breakover the impedance of the diac 26 is low, as a result of which the capacitor 30 will be discharged rapidly with a comparatively large current. If the voltage across the triac 18 is high enough the triac 18 will now be triggered. However, this will occur only if the electrical switch is open. Once the capacitor 30 has discharged into the gate electrode 24 the current supplied by the resistor 32 is not adequate to keep the triac 18 in conduction and the process of charging the capacitor 30 will be resumed. During the negative half-cycle of the mains supply voltage the process is the same, with the understanding that the capacitor 30 will be charged to a negative voltage Vn so that the gate current Ig will be reversed. If the mains supply voltage is rectified the voltage Vn and the current Ig will always have the same polarity and direction, enabling a unidirectional thyristor to be used instead of a triac.

When the electrical switch is now opened the next discharge of the capacitor 30 will trigger the triac 18. The triac 18 will remain conductive until the next zero crossing of the mains supply voltage, thereby suppressing any voltage transient across the contacts of the electrical switch 4. Normally, the electrical switch 4 is then still open unless the contacts bounce. In that case the triac is triggered several times.

Once the electrical switch 4 is open no current flows through the load 2 and the voltage difference between the first connection terminal 12 and the third connection terminal 16 is zero. The capacitor 30 cannot be charged and no gate current is applied to the triac 18. The result is that the triac 18 remains off.

Figure 5:
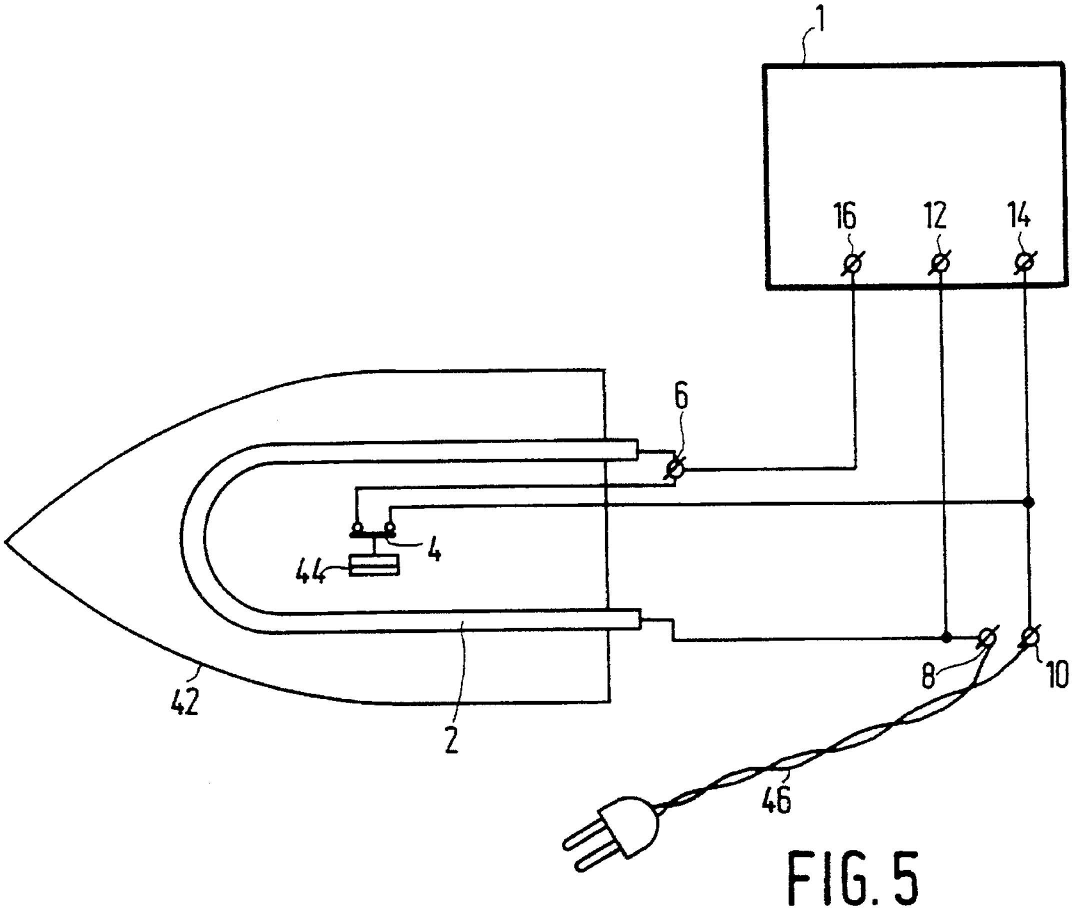
FIG. 5 shows an electrical circuit diagram of the iron shown in FIG. 3.

The spark suppression circuit 1 shown in the FIGS. 1 and 2 is very suitable for use in electrical thermal appliances in which a heating element is switched on and off repeatedly to control the temperature of the heating element. FIG. 4 shows an electric iron provided with a spark suppression circuit according to the invention. FIG. 4 does not show the spark suppression circuit itself but this circuit can be mounted in any suitable place inside the iron. The iron comprises a housing 40 having a sole plate 42 at its bottom. A heating element 2 is arranged in the sole plate 42. FIG. 5 shows the electrical circuit diagram of the iron. The electrical switch 4 comprises a thermal element 44 (bimetal), which is thermally coupled to the sole plate 42. The electrical switch 4 thus operates as a thermostatic switch which opens when the temperature of the sole plate reaches a predetermined value. The iron receives a mains supply voltage via a power cord 46, which is connected to the first and second main supply terminals 8 and 10. The spark suppressor 1 may be of the same type as shown in FIG. 1 or 2 and is connected to the heating element 2 and the electrical switch 4 in the same way as shown in FIG. 1 or 2.

I claim:

1. A spark suppressor circuit (1) for protection of an electrical switch (4) which in series with a load (2) is connected between a first supply voltage terminal (8) and a second supply voltage terminal (10), the load (2) and the electrical switch (4) being interconnected at a switch terminal (6), the spark suppressor circuit (1) comprising:

a first (12), a second (14), and a third (16) connection terminal connectable to the first supply voltage terminal (8), the second supply voltage terminal (10) and the switch terminal (6), respectively, a triggerable electronic switch (18) having a first main electrode (20) connected to the third connection terminal (16), having a second main electrode (22) connected to the second connection terminal (14), and having a gate electrode (24), and trigger means for triggering the triggerable electronic switch, wherein the trigger means comprises current supply means (32) coupled between the first connection terminal (12) and the gate electrode (24) of the triggerable electronic switch (18) and supplying bidirectional current to said gate electrode (24)

a threshold device (26) connected between the gate electrode (24) of the triggerable switch (18) and a node (28) connected to the current supply means, said threshold device passing current to the gate electrode (24) when the voltage difference between the gate electrode (24) and the node (28) exceeds a predetermined value, and a capacitor (30) connected directly between the node (28) and the third connection terminal (16).

2. A spark suppressor circuit as claimed in claim 1, wherein that the triggerable electronic switch (18) is a triac.

3. A spark suppressor circuit as claimed in claim 2 wherein the threshold device (26) comprises a diac.

4. A spark suppressor circuit as claimed in claim 2 wherein the current supply means (32) comprises a resistor.

5. A spark suppressor circuit as claimed in claim 1, wherein the triggerable electronic switch (18) is a thyristor.

6. A spark suppressor circuit as claimed in claim 5 wherein the threshold device (26) comprises a diac.

7. A spark suppressor circuit as claimed in claim 5 wherein the current supply means (32) comprises a resistor.

8. A spark suppressor circuit as claimed in claim 1, wherein the threshold device (26) comprises a diac.

9. A spark suppressor circuit as claimed in claim 8 wherein the current supply means (32) comprises a resistor.

10. A spark suppressor circuit as claimed in claim 1 wherein the current supply means (32) comprises a resistor.

11. An electrical thermal appliance which comprises a first supply terminal (8), a second supply terminal (10) and a switch terminal (6), an electrical switch (4), which in series with a heating element (2) is connected between the first supply voltage terminal (8) and the second supply voltage terminal (10), the heating element (2) and the electrical switch (4) being interconnected at the switch terminal (6), and a spark suppression circuit (1), a first (12), a second (14) and a third (16) connection terminal of the spark suppression circuit being connected to the first supply voltage terminal (8), the second supply voltage terminal (10) and the switch terminal (6), respectively and said spark suppression circuit also comprising a triggerable electronic switch (18) having a first main electrode (20) connected to the third connection terminal (16), having a second main electrode (22) connected to the second connection terminal (14), and having a gate electrode (24), and trigger means for triggering the triggerable electronic switch, wherein the trigger means comprises current supply means (32) coupled between the first connection terminal (12) and the gate electrode (24) of the triggerable electronic switch (18) and supplying bidirectional current to said gate electrode (24)

a threshold device (26) connected between the gate electrode (24) of the triggerable switch (18) and a node (28) connected to the current supply means, said threshold device passing current to the gate electrode (24) when the voltage difference between the gate electrode (24) and the node (28) exceeds a predetermined value, and a capacitor (30) connected directly between the node (28) and the third connection terminal (16).

12. An electrical appliance as claimed in claim 11, wherein the electrical switch (4) is a thermostatic switch comprising a thermal element (44) which is thermally coupled to the heating element (2).

13. An electrical appliance as claimed in claim 11, wherein that the electrical appliance is an electric flat-iron.

14. The electrical thermal appliance in claim 11 wherein the triggerable electronic switch (18) is a diac.

15. The electrical thermal appliance in claim 11 wherein the triggerable electronic switch (18) is a thyristor.

16. The electrical thermal appliance of claim 11 wherein the threshold device (26) comprises a diac.

17. The electrical thermal appliance of claim 11 wherein the current supply means (32) comprises a resistor.

18. The electrical thermal appliance of claim 11 comprising an electric flat-iron.

* * * * *